July 14, 1931.  L. J. BARWOOD  1,814,502

WASHER

Filed Dec. 19, 1929

Inventor
Leon J. Barwood
by David Rines
Attorney

Patented July 14, 1931

1,814,502

UNITED STATES PATENT OFFICE

LEON JOACHIM BARWOOD, OF CAMBRIDGE, MASSACHUSETTS

WASHER

Application filed December 19, 1929. Serial No. 415,204.

The present invention relates to washers.

Figure 1:
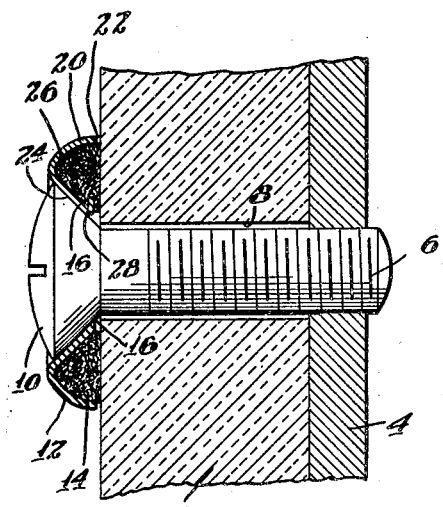
Figure 2:
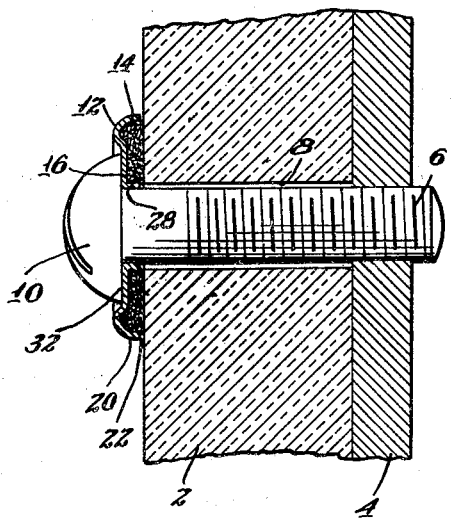
Figure 3:
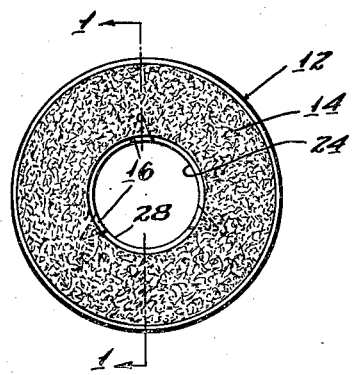

The invention will be more fully explained in connection with the accompanying drawings, in which Fig. 1 is a cross section, showing a washer constructed according to a preferred embodiment of the present invention, secured in place upon an article in connection with which it is adapted to be used, the section being taken upon the line 1—1 of Fig. 3; Fig. 2 is a similar view of a modification; and Fig. 3 is a rear elevation of the washer shown in Fig. 1.

It is common to secure fragile articles, like the glass article 2, to a frame 4, by means of bolts, screws, or other members 6 that extend through openings 8 in the article 2 and into the frame 4. Between the head 10 of the member 6 and the article 2, a padded ring washer is now frequently employed, comprising a metal ring element 12 and an asbestos ring element 14 secured together, side by side, in a unitary structure, so as to be capable of manipulation as a unit. The metal ring element 12 is provided with a peripheral flange 20 that hides the element 14 when the washer is mounted upon the article 2. The flange 20 is of dimension such as to leave a small gap 22 between the flange 20 and the article 2, thereby preventing the flange 20 from breaking or scratching the fragile article 2.

A chief object of the present invention is to improve upon washers of the above-described character, and more particularly the joints between the metal and the non-metal elements of the washer. The invention has particular application in connection with metal washers of special shape.

Referring, first, to Fig. 1, the head 10 of the screw 6 is shown provided with a tapering or conical surface 24. When employing a screw of this nature, it is necessary that the washer have a correspondingly tapering or countersunk seating wall 26. The lower portion 28 of this wall, near the central opening of the metal ring element 12, therefore, extends, as shown, part way into the corresponding central opening of the asbestos ring element 14, through which central openings the screw 6 extends. The portion 28 of the metal ring element 12 is provided along its central opening with a plurality of comparatively large size, separated prongs 16 bent over, as shown, and embedded in the wall of the central opening of the asbestos ring element 14. By reason of the fact that the prongs 16 are spaced from each other along the circumference of the central opening, they may be bent away from the conical surface 24 at an obtuse angle, as shown, and thereby secure a more firm biting action into the asbestos ring element 14. If a continuous flange, instead of the separated prongs 16 were employed, so obtuse an angle of bending would result in breaking the metal of the washer, and the cracks along which the breaks were produced would spread in use until the whole washer became useless. Furthermore, the bending of a continuous flange, instead of the separated prongs, causes the wall 26 to become bent out of shape, so that the surface 24 can not lie smoothly in contact therewith. For these reasons, therefore, the use of the separate prongs results in a more ready and more efficient assembly of the elements and a superior product. The separated joints would, in theory, provide a less firm holding action than a continuous flange; but it is found, in practice, that the length of the prongs may be made greater than could be the width of a continuous flange, to compensate, and the metal and non-metal elements of the washer are held together very effectively as a unit. The portion 28 of the metal washer 12 is driven into the central opening of the asbestos washer 14, causing the latter to become tightly wedged into the annular space or groove between the tapering wall 26 and the flange 20, and the prongs 16 are then bent over and embedded firmly and deeply in the central-opening wall of the asbestos washer 14, securing the washer elements very effectively together. The flange 20, in this construction, thus helps the prongs 16 to hold the parts together.

According to the modification of Fig. 2, the metal element may be provided with a flat portion 32, instead of with the conical wall 26 of Fig. 1. The padded washer may thus be used with a screw having an underside flat head, as shown in Fig. 2, instead of with a head having the tapering-wall head shown in Fig. 1. Here again, by providing an annular space or groove between the flat portion 32 and the flange 20 adjacent to the peripheral flange, and wedging the asbestos washer into this groove, the flange 20 may be caused to aid the holding action of the prongs 16. In all cases, the asbestos acts as a padding or cushion to take up shocks and to prevent injury to the article 2.

In accordance with the requirements of the statutes, preferred embodiments of the invention have been illustrated and described herein, but it will be understood that the invention is not restricted to the exact illustrative embodiments. It is desired, therefore, that the appended claim be broadly construed, except insofar as limitations may be made necessary by the state of the prior art. Thus, the term "ring" is not to be restricted to the use of a circular ring, as a ring of any other shape is equally within the spirit and scope of the invention, as defined in the appended claim.

What is claimed is:

A padded ring washer comprising a metal ring element and a fibrous ring element, the metal ring element having a plurality of prongs along its opening extending into the fibrous ring element and embedded in the fibrous ring element along the opening of the fibrous ring element, whereby the ring elements are assembled together side by side in a unitary structure so as to be manipulated as a unit, the fibrous ring element being yielding and adapted to engage against an article upon which the washer is adapted to be mounted so as to act as a padding, the fibrous ring element being wedged into the metal ring element, and the washer being adapted to be secured to the article by a member extending through the openings of the ring elements and into the article.

In testimony whereof, I have hereunto subscribed my name.

LEON J. BARWOOD.